July 17, 1956  A. ROGERS ET AL  2,754,613
FISH LURE
Filed Feb. 21, 1955

INVENTORS
ANTHONY ROGERS
ANNIE C. ROGERS

2,754,613
FISH LURE

Anthony Rogers and Annie C. Rogers,
San Leandro, Calif.

Application February 21, 1955, Serial No. 489,527

1 Claim. (Cl. 43—42.38)

This invention relates to fishing lures.

It is an object of the present invention to provide an improved fishing lure wherein the fisherman may use any type of hook he desires.

It is still another object of the present invention to provide a fishing lure of the above type which is adapted to hold the bait therewithin without having to thread the bait into the hook and which lure can be used for trolling with single, triple and double hooks.

It is still another object of the present invention to provide a fishing lure which can be used for shore fishing, boat fishing and for trolling and which will effect an economy inasmuch as this will eliminate the necessity of employing different lures.

For other objects and a better understanding of the invention, reference may be had to the following detailed description taken in connection with the accompanying drawing, in which.

Figure 1:
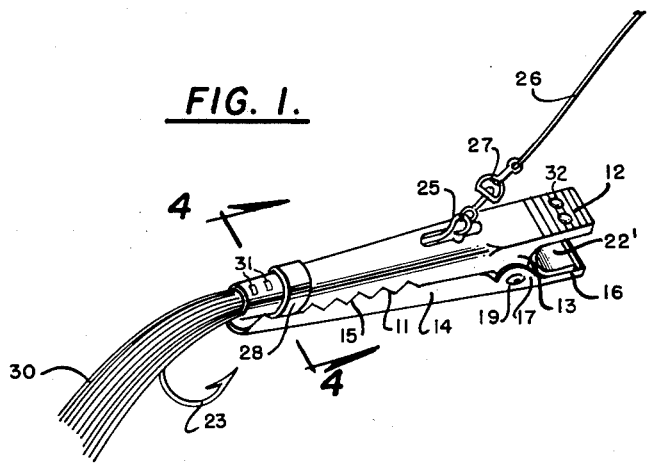
Figure 1 is a perspective view of a preferred embodiment of the present invention.

Referring now more in detail to the drawing, 10 represents a channel shaped jaw member of semicircular cross section provided along its lower edges with the teeth 11, the jaw 10 at one end being integrally formed with the flat handle portion 12 from which depends the semicircular bearing plates 13, substantially as illustrated.

A complementary channel-shaped jaw 14 of semicircular cross section is likewise provided along its upper edges with the teeth 15 and is integrally formed at one end with the flat handle portion 16 from which extend the upwardly directed bearing plates 17 which are received on the outer faces of the bearing plates 13 and are pivotally connected thereto by means of a transverse pin 18 whereby to permit the opening and closing of the jaws 10 and 14. Artificial fish eyes 19 are secured to the opposite ends of the pin 18 and serve to retain the same against displacement by abutting against the bearing plates 17, 13.

The teeth 15 of the jaw 14 cooperate with the teeth 11 of jaw 10 to retain therebetween the bait.

The jaw 10 is provided with a cross-shaped opening 20 therethrough for a purpose which will hereinafter become clear.

An intermediate channel-shaped member 21 of U-shaped cross section is integrally formed at one end with a hook shaped portion 22 which rotatably engages the pin 18 intermediate the plates 13, 17 to pivotally mount the channel-shaped member 21 intermediate the jaws 10, 14.

A U-shaped leaf spring 22' is positioned intermediate the handle portions 12, 16 and serves to normally retain the jaws 10, 14 in the closed position, as will be obvious.

Figure 4:
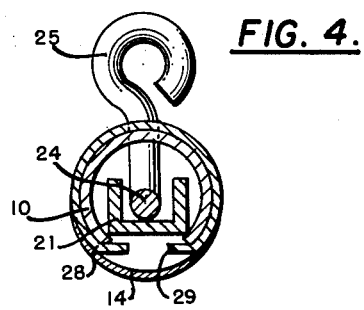
Fig. 4 is a transverse sectional view thereof taken along the line 4—4 of Fig. 1.

A hook 23 includes an elongated shank portion 24 adapted to fit within the channel shaped member 21 (Fig. 4) and terminates in a laterally bent loop 24 adapted to fit through the longitudinal portion of the slot 20 and to be retained therein when rotated ninety degrees. The loop 25 when in the operative position within the slot 20 is connected to the line 26 by means of a snap swivel 27.

In order to lock the shank 24 within the channel shaped member 21 and the latter within the jaw 10, a collar 28 having an opening 29 is slidable longitudinally onto the free end of the jaw 10 to the locking position of Fig. 1. It will be noted that the lower ends of the collar 28 are bent laterally inwardly to define the opening 29 and to engage the undersurface of the jaw 10.

A tail 30 of rubber, plastic or other suitable material is suitably secured within the free end of the jaw 10 to complete the lure, for example, by means of wire 31.

Figure 2:
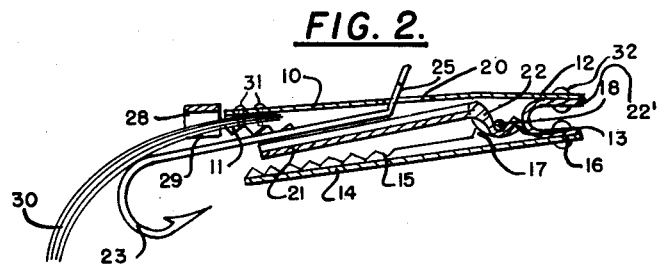
Fig. 2 is a longitudinal sectional view thereof but shown in the open position to permit the insertion of the hook.
Figure 3:
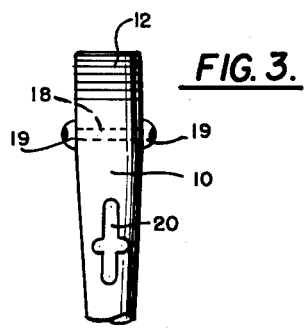
Fig. 3 is a fragmentary top plan view thereof.

To connect the hook 23, the sleeve 28 is rotated to the position of Fig. 2 away from the jaw 10 and the handle portions 12, 16 are pressed together against the action of the spring 22' to open the jaws 10, 14 and to permit the lowering of the channel shaped member 21 relative to the jaw 10. The hook 23 is then inserted by rotating the loop 25 so that it passes through the longitudinal portion of the opening 20 and then moving the shank 24 into alignment with the channel shaped member 21 whereupon the channel shaped member 21 is moved upwardly into the jaw 10 (Fig. 4) with the shank 24 therebetween and the assembly is locked by moving the sleeve 28 inwardly to the position of Fig. 1 to secure the shank 24 on channel-shaped member 21 within the jaw 10. The bait may then be inserted intermediate the teeth 11, 15 to be retained therebetween by means of the spring 22' upon release of the handles 12, 16.

By reversing the above steps, the hook 23 may be removed to be replaced by any other hook it is desired to used including double and triple hooks.

It should now be apparent that there has been provided a fish lure which may be used interchangeably with any type of hook to effect an obvious economy. It should also be apparent that there has been provided a fishing lure which will hold the bait without the necessity of threading the same onto the hook.

While various changes may be made in the detail construction, it shall be understood that such changes shall be within the spirit and scope of the present invention as defined by the appended claim.

What we claim as new and desire to protect by Letters Patent of the United States is:

A fish lure for holding bait on a fish hook comprising a pair of complementary channel-shaped jaws, depending and upwardly extending plates formed on said jaws near one end, a pin piercing said plates whereby to pivotally connect the same, means for retaining said pin against displacement through said plates, flat handle portions formed at one end in each of said jaws and adapted to be pressed together whereby to open said jaws, a substantially U-shaped leaf spring intermediate said flattened portions, one of said jaws having a slot adapted to receive therethrough the looped end of a fish hook and releasable means for retaining said fish hook along the shank portion thereof within said jaw having said slot whereby to secure the hook interchangeably to said jaw and to permit the insertion between said jaws of the bait, said means for retaining the shank of the hook within said jaw comprising an elongated channel-shaped member of substantially U-shaped cross section pivotally connected to said pin at one end, said channel-shaped member being adapted to fit upwardly within said jaw having said slot with the shank of the fish hook therein, and a collar slidable longitudinally along said jaw having said slot, said collar having an opening in the periphery to permit the insertion therethrough of the shank of the fish hook, a portion of said collar adjacent the edges of said opening being engageable with the lower edges of said jaw having said slot whereby to secure said channel-shaped member and fish hook shank within said jaw having said slot.

References Cited in the file of this patent

UNITED STATES PATENTS

| | | |
|---|---|---|
| 1,324,109 | Dutes | Dec. 9, 1919 |
| 2,003,366 | Jordan | June 4, 1935 |
| 2,009,540 | Applegate | July 30, 1935 |
| 2,021,796 | Liotta | Nov. 19, 1935 |
| 2,215,772 | Vecchia | Sept. 24, 1940 |